Sept. 29, 1964 G. SPECTOR ET AL 3,151,311

MAGNETIC CORE CONTROL CIRCUIT FOR ACTUATING SOLENOID DEVICES UTILIZING A SINGLE SENSE AMPLIFIER

Filed April 3, 1962 2 Sheets-Sheet 1

INVENTORS
GERALD SPECTOR &
JAMES V. FAYER
BY John V. Regan
Attorney

Sept. 29, 1964 G. SPECTOR ETAL 3,151,311

MAGNETIC CORE CONTROL CIRCUIT FOR ACTUATING SOLENOID DEVICES UTILIZING A SINGLE SENSE AMPLIFIER

Filed April 3, 1962 2 Sheets-Sheet 2

INVENTORS
GERALD SPECTOR &
JAMES V. FAYER
BY John V. Regan
Attorney

United States Patent Office 3,151,311
Patented Sept. 29, 1964

3,151,311

MAGNETIC CORE CONTROL CIRCUIT FOR ACTUATING SOLENOID DEVICES UTILIZING A SINGLE SENSE AMPLIFIER

Gerald Spector, Philadelphia, Pa., and James V. Fayer, Lindenwold, N.J., assignors to Radio Corporation of America, a corporation of Delaware Filed Apr. 3, 1962, Ser. No. 184,818
7 Claims. (Cl. 340—166)

This invention relates to apparatus wherein selected ones of a number of devices are actuated on command and, in particular, to control means for actuating current energized devices selectively in response to clocked energizing signals.

Card and tape punch mechanisms and electromechanical printers are examples of apparatus which employ a number of current energized elements such as punches or printer hammers. In general, the devices are actuated by solenoid drive and require an energizing signal of greater than a given duration. Particular ones of the devices to be actuated may be selected in response to information signals previously stored in a memory. A desirable memory is one of the magnetic core type because of its speed, economy and reliability. A difficulty encountered is that the information signals from such a memory are often of insufficient duration and amplitude to actuate the solenoids which have a comparatively slow response time.

Prior art arrangements have solved the amplitude problem by using a number of amplifiers equal to the number of solenoids in the apparatus. An intermediate storage register such as a shift register has solved the problem of the short duration of the energizing signals. The disadvantages of the prior art arrangements are that the large number of amplifiers and an intermediate storage register increase cost, have high space requirements, and have increased susceptibility of the system to component failure.

Accordingly, it is one object of the present invention to provide an improved control arrangement for actuating comparatively slow response time current energized devices in response to short duration command signals.

It is another object of this invention to provide improved control means which does not require a separate amplifier for each current energizable element.

It is still a further object of the invention to provide a current for actuating preselected ones of a plurality of current operated devices in response to a command signal read from a memory.

In accordance with the present invention, a separate bistable switching device is provided for each of the current energized devices. A bistable switching device is placed in one state of conduction in response to a short duration command signal and an energizing signal. Moreover, the device remains in that one state until the energizing signal ends, regardless of the duration of the command signal. The command signals are read from a memory one at a time in response to a set of memory address signals. A common sense amplifier is used for all the memory locations. The common sense amplifier is connected by way of a different signal gate to each of the bistable devices. The selection of a desired gate, and hence the particular current energized device, is made by the same memory address signals used in reading the stored information. Each different set of memory address signals enables a different one of the gates. The output signal from the selected gate is the short duration command signal applied to the bistable device. An electronic switch common to all the current energized elements provides the energizing signal for all the bistable devices. The bistable device that changes to the one state of conduction is the one that receives both the command signal and the energizing signal. Upon removal of the energizing signal the selected device changes from the one state to the other state.

Figures 3A, 3B:
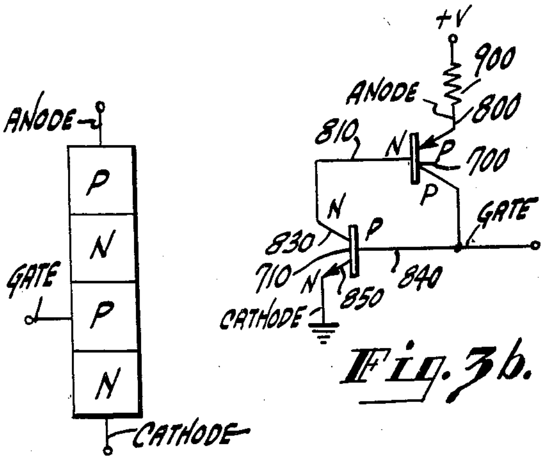
Figure 4:
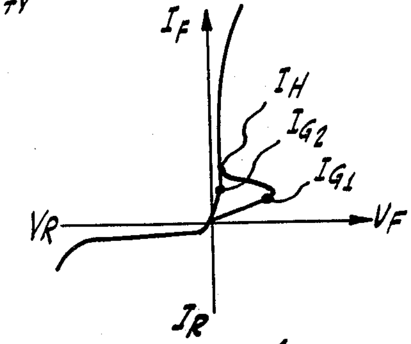
Figure 2:
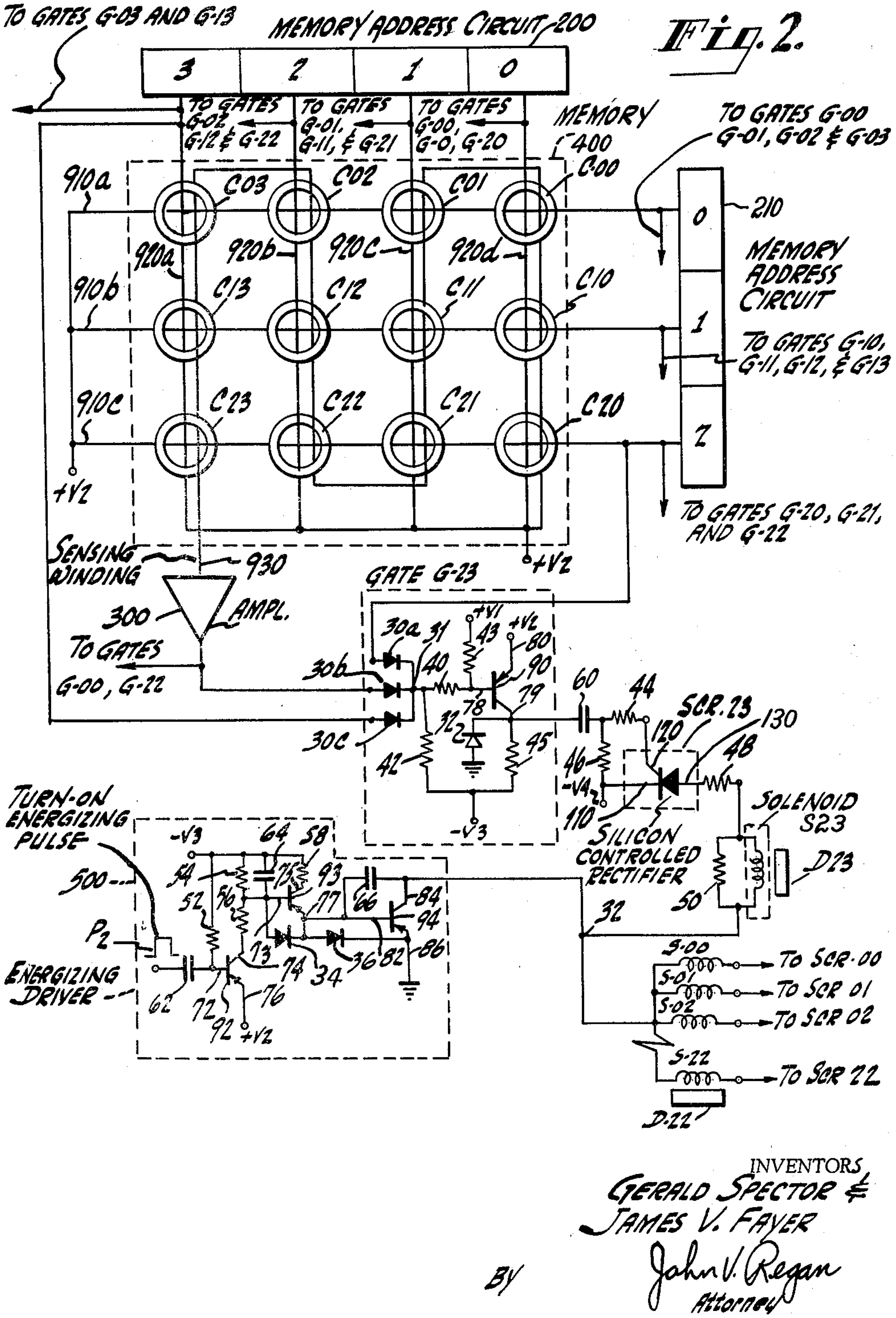
FIGURE 2 is the schematic diagram of an apparatus according to the present invention.

FIGURE 3*a* is a symbolic representation of a PNPN silicon controlled rectifier used as a bistable element in the apparatus of FIGURE 2;

FIGURE 3*b* is an equivalent two transistor version of the PNPN device of FIGURE 3*a*; and, FIGURE 4 is the voltage-current (V-I) characteristic of a silicon controlled rectifier.

Figure 1:
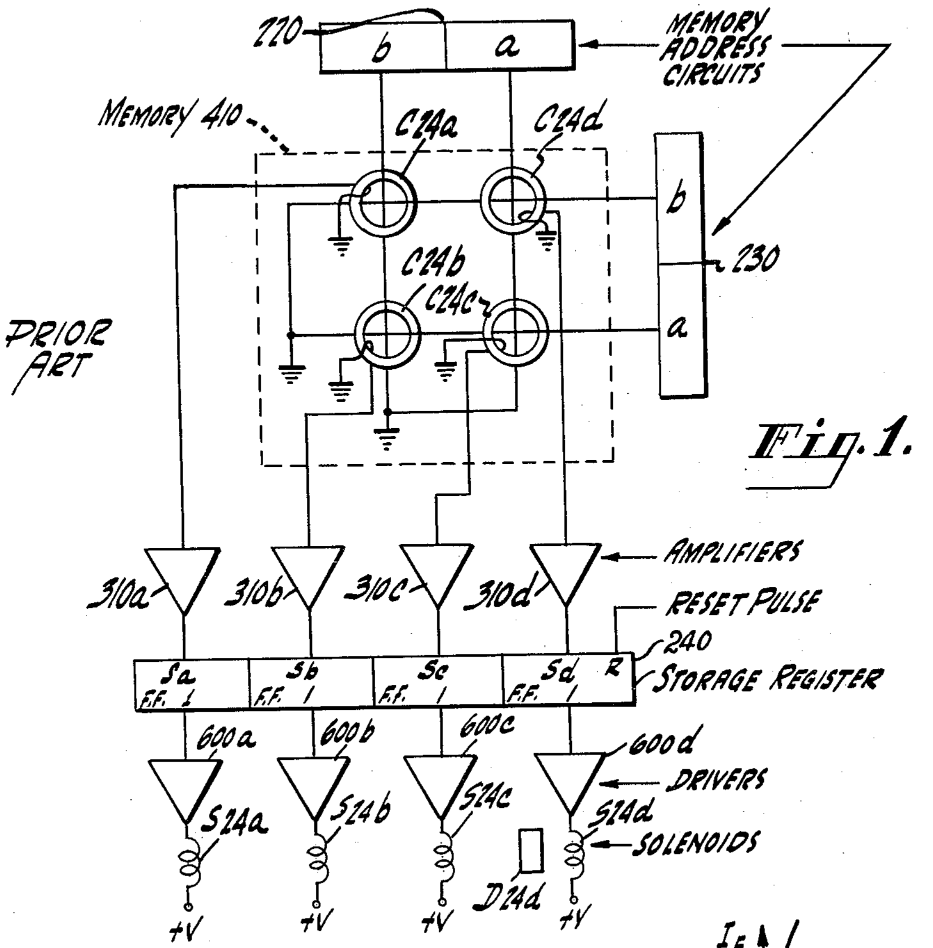
FIGURE 1 is a block diagram of one prior art arrangement of apparatus using current energized devices.

FIGURE 1 is an example of a prior apparatus useful in electromechanical punching and printing applications. Solenoids S24*a*–S24*d* are used to actuate a like number of devices, one being indicated at D24*d*. The actuated devices may be, for example, print hammers. Each solenoid S24 is energized by current flow through its coil for a time longer than a minimum duration. A memory 410 is used to store the information used to select the desired solenoid (or solenoids). The memory 410 may be a magnetic core array, for example, in which each core in the array corresponds to a different one of solenoids S24*a*–S24*d*. For example, core C24*a* corresponds to solenoid S24*a*, C24*b* corresponds to solenoid S24*b*, and so on.

For convenience of illustration only, the memory 410 is shown as a 2 x 2 core array and it is to be understood that the memories in common use have a much larger storage capacity. The information is stored at desired addresses in the memory 410 under the control of column address circuits 220 and row address circuits 230. The memory address circuits 220 and 230 are well known in the art and operate to apply currents selectively to the row and column coils of the desired core C24.

The output from the selected one of the four cores is coupled to one of four sense amplifiers 310*a*–310*d* by one of four sense windings. For example, amplifier 310*a* receives the output from core C24*a*, and so on. The outputs from the amplifiers are coupled to the set inputs (S) of the flip-flops of a storage register 240 which has a separate stage for each one of the sense amplifiers 310*a*–310*d*. A binary "one" signal, for example, from the memory core causes the coupled flip-flop to be set. When a flip-flop is set, the "1" output of the flip-flop is, for example, a low level. When reset the "1" level is high. A common reset R may be used for the register 240. Stage $S_a$ of the register stores the information signal read from core C24*a*, $S_b$ the information from core C24*b*, and so on.

Each stage of the register 240 is coupled through a different one of current amplifier circuits 600*a*–600*d* to a different one of the solenoids S24*a*–S24*d*. The amplifier circuits 600 when energized by a register flip-flop signal provide a relatively heavy current flow through the respective solenoids.

The storage register 240 operates as a temporary store for the output signals from the memory so that the resulting command signals are of sufficient duration to energize the solenoids.

FIGURE 2 is a schematic diagram of an apparatus in accordance with the present invention. There is shown a memory 400 having, for example, twelve magnetic cores arranged in four columns and three rows. The information is stored in each of the cores by coincident currents supplied by the column and row addressing circuits 200 and 210. Each of the four outputs of the column circuit 200 is connected to a separate one of four column coils 920*a*–920*d*, and each of the three outputs of the row circuits 210 is connected to a separate one of the three row coils 910*a*–910*c*. The row coils 910 and the column coils 920 after linking the memory cores are each connected to a bias potential source $+V_2$. A sense winding 930 links all the magnetic cores in the memory and is connected at one end to the bias potential source $+V_2$ and its other end is coupled to sense amplifier 300, so that the output signals from each one of the magnetic cores is coupled to the amplifier 300. The output terminal of amplifier 300 is coupled to an input terminal of each of a plurality of identical coincident signal control gates. Each gate corresponds to a different one of said magnetic cores, for example, gate G23 corresponds to core C23.

Only gate G23 is shown in the drawing as a matter of convenience of illustration. Gate G23 comprises diodes 30*a*, 30*b* and 30*c*. The cathode electrodes of diodes 30*a*, 30*b* and 30*c* are connected to a common junction point 31. The anode electrodes of 30*a*, 30*b* and 30*c* constitute the input terminals of gate G23. The output terminal of amplifier 300 is coupled to a first input terminal of gate G23 at the anode of diode 30*b*. The second row output of row address circuit 210 is coupled to a second input terminal of the gate G23 at the anode of diode 30*a*, and the first column output of the column address circuitry 200 is coupled to the third input terminal of gate G23 at the anode of diode 30*c*. Each different pair of output terminals of the column and row circuitry 200 and 210 is coupled to two inputs of the remaining eleven gates corresponding to the remaining memory locations.

The common junction point 31 is coupled through a resistor 42 to a source of bias potential $-V_3$, and through a resistor 40 to the base electrode 78 of transistor 90. The base electrode 78 is coupled through a resistor 43 to a source of bias potential $+V_1$. The emitter electrode 80 of transistor 90 is coupled to a source of bias potential $+V_2$ and the collector electrode 79 of transistor 90 is coupled through a resistor 45 to a source of bias potential $-V_3$. The collector electrode 79 is normally clamped to a reference potential, indicated as a common ground, by clamp diode 32. When negative-going signals are applied at the same time to all the input terminals of gate G23, the transistor 90 is biased to conduction, and the collector voltage rises from its normal value to a value positive with respect to ground.

The output of gate G23 is coupled through a capacitor 60 to a series circuit comprising a bistable switching device such as a silicon controlled rectifier SCR23 and a solenoid S23. The capacitor 60 is coupled through a resistor 44 to the gate or control electrode 120 of SCR23, and through resistor 46 to a source of bias potential $-V_4$ which is also connected to the cathode electrode 110 of the SCR23. The anode electrode 130 of SCR23 is coupled through resistor 48 to solenoid S23. A resistor 50 is connected across S23 to provide a current path when SCR23 is triggered into conduction. D23 is a device such as a print hammer which is actuated by the flow of current through S23.

Solenoids $S_{00}$–$S_{03}$, $S_{10}$–$S_{13}$, and $S_{20}$–$S_{23}$ are all connected to junction point 32. Each of solenoids $S_{00}$–$S_{03}$, $S_{10}$–$S_{13}$, and $S_{20}$–$S_{23}$ is connected at its other end to the anode of a respective one of the silicon controlled rectifiers $SCR_{00}$–$SCR_{03}$, $SCR_{10}$–$SCR_{13}$, and $SCR_{20}$–$SCR_{23}$ (not shown). The gate electrodes of each one of these silicon controlled rectifiers is connected respectively to the outputs of the separate control gates (not shown) which are each three-input gates such as gate G23.

An energizing driver circuit 500 is coupled to the common junction point 32. The driver circuit 500 comprises a first transistor 92 having its emitter electrode 76 coupled to a source of bias potential $+V_2$, and its collector electrode 74 coupled through resistor 56 in series with resistor 54 to a source of bias potential $-V_3$. Its base electrode 72 is also coupled through resistor 52 to the source of bias potential $-V_3$. An energizing pulse $P_2$ is coupled to the base electrode 72 of transistor 92 through capacitor 62. A second transistor 93 has its collector electrode 75 coupled through resistor 58 to a source of bias potential $-V_3$ and its base electrode 73 coupled through resistor 54 to bias potential source $-V_3$. A speed-up capacitor 64 is connected across resistor 54. Diode 34 couples base electrode 73 of transistor 93 to emitter electrode 77 of the same transistor. The emitter electrode 77 of transistor 93 is also connected to the base electrode 82 of a third transistor 94 and through a capacitor 66 to the collector electrode 84 of transistor 94. The emitter electrode 77 of transistor 93 is coupled through diode 36 to the ground and to the emitter electrode 86 of transistor 94. The output electrode 84 of the third transistor 94 constitutes the output terminal of the energizing driver circuit 500.

FIGURE 3*a* shows the equivalent circuit of a PNPN silicon controlled rectifier such as those used in FIGURE 2. The rectifier has a gate electrode, an anode electrode, and a cathode electrode. This type device is known in the art and is commercially available. The same bistable operation can be obtained by using two separate transistors as shown by the equivalent circuit of FIGURE 3*b*. Here a PNP transistor 700 and an NPN transistor 710 have the base electrode of one directly connected to the collector electrode of the other. The collector 800 of PNP transistor 700 corresponds to the anode, the emitter 850 of NPN transistor 710 corresponds to the cathode, and the base of the NPN transistor 710 corresponds to the gate of the FIGURE 3*a* rectifier.

The operation of a silicon controlled rectifier is analogous to that of a thyratron or ignitron, for example, in that the device, once triggered into conduction, remains in a high conductivity state after the triggering pulse is terminated provided a suitable anode voltage and current path is provided. FIGURE 4 shows the voltage-current characteristic of a silicon-controlled rectifier. When the rectifier is forward biased, a current $I_{G1}$ applied to the gate electrode of the rectifier switches the rectifier through its negative resistance region into high current conduction. The device remains conducting until the anode-cathode current path is interrupted, as for example, by applying a reverse-bias voltage to its anode, or by reducing the value of the current in the anode-cathode current path below a value $I_H$ (the holding current) shown in FIGURE 4 at the end of the negative resistance region. FIGURE 4 also illustrates that the forward-bias voltage is reduced when the current applied to the gate electrode of the rectifier is increased.

In operation, assume for example, that it is desired to actuate device D23 and that a "one" signal is stored in corresponding core C23. During the next memory read operation, the concurrent signals applied to the first column line 920*a* and the third row line 910*c* changes core C23 from the "one" state to the "zero" state. The core C23 thus induces a signal in sensing winding 930 which is applied to amplifier 300. The output signal of amplifier 300 is a negative pulse. The first column and third row selecting signals from row and column address circuits 210 and 200 also are negative-going pulses. All these three signals are applied at the same time to the input terminals of gate G23. Transistor 90 is normally biased to be non-conductive and the voltage at its collector electrode 79 is clamped to about zero volts by diode 32. The three input signals applied to the gate G23 render transistor 90 conductive and its output voltage at collector electrode 79 increases to a value of $+V_2$. The application of this positive-going voltage to the gate electrode 120 of the silicon controlled rectifier SCR23 triggers it into conduction, as long as a positive energizing voltage is applied to its anode electrode 130.

The energizing pulse $P_2$ is applied to the input terminal of driver circuit 500 at the same time as or slightly prior to the memory selecting signals so that the pulse $P_2$ occurs substantially coincidentally with the memory selecting signals. The energizing pulse $P_2$ changes transistor 92 from its normally conductive to its non-conductive condition. The voltage at collector electrode 74 becomes approximately $-V_3$ which in turn is coupled through the voltage divider comprising resistors 56 and 54, to the base electrode 73 of transistor 93. The negative voltage at the base of the transistor causes emitter-follower transistor 93 to conduct. Diode 34 is then rendered non-conductive. The base electrode 82 of the third transistor 94 also becomes more negative so that transistor 94 is rendered to be conductive and diode 36 is rendered to be non-conductive. The positive voltage at collector 84 of the third transistor 94 is applied as an energizing signal to junction 32, and hence to the anode electrode 130 of silicon controlled rectifier SCR23. The energizing signal is applied during the application of the command signal from gate G23 to the gate electrode 120 of the silicon controlled rectifier SCR23.

Current flows through the solenoid S23, when the SCR23 is triggered into conduction, for a time sufficiently long to activate D23. When energizing pulse $P_2$ terminates, transistor 92 is rendered conductive, and transistors 93 and 94 are rendered non-conductive. The negative-going voltage appearing at collector 84 of the third transistor 94 in turn switches SCR23 off.

If the memory core C23 were storing a binary "zero" no, or at most, little voltage would be produced in sense winding 930 and the sense amplifier 300 would not be activated. Thus, gate G23 would not be activated and no command signal would be applied to the gate electrode of SCR23. The energizing pulse then would not cause conduction of SCR23 and device D23 would not be actuated. Any other device must be selected in similar manner in response to the information stored in the corresponding memory core.

What is claimed is:

1. In combination,
a group of memory elements for storing binary information,
means common to the output of each of said elements,
means for selectively energizing said memory elements, a plurality of coincident signal gates one for each memory element,
means coupling said common means to each one of said plurality of gates,
means coupling said memory energizing means to each one of said plurality of gates so that when one of said memory elements is selected its corresponding gate is enabled,
a plurality of signal controlled bistable switching devices each being coupled to a different one of said gates,
a plurality of current energized elements each connected in series with a different one of said switching devices,
and means coupled to all said elements for applying an energizing pulse clocked to said memory energizing means whereby when one of said gates is enabled the corresponding bistable device is switched to one of its operating states for a length of time corresponding to the width of the energizing pulse being applied.

2. The combination comprising,
a $n$ times $x$ array of memory elements for storing binary information,
memory selecting means for generating address signals, means for applying said address signals to said array for selecting a desired one of said memory elements for reading stored information,
sensing means common to all said memory elements,
a separate logic circuit for each of said memory elements, said logic circuits being coupled to said memory selecting means so that when one of said memory elements is selected only its corresponding logic circuit is operated,
a plurality of signal controlled bistable devices each connected to a different one of said logic circuits, a plurality of current energizable output elements each connected in series with a different one of said bistable devices,
and an electronic switch coupled to all said output elements for applying pulses clocked to said memory selecting means whereby when a memory element is selected its corresponding bistable device is energized for a time determined by the duration of each of said pulses.

3. In combination with a magnetic core array,
means for applying memory energizing signals selectively to the cores of said array for selecting a desired core,
sensing means common to all said cores,
a separate coincident signal gate for each one of said cores,
means coupling said sensing means to each of said gates,
means coupling said energizing means to each one of said gates so that when one of said cores is energized its corresponding gate is enabled,
a plurality of signal controlled bistable switching devices each having a control electrode and first and second electrodes defining a current path so that when a switching signal of appropriate magnitude and polarity is applied to said control electrode and an energizing signal is applied to said first and second electrodes current flows through said current path until said energizing signal ends, means coupling each separate one of said gates to the control electrode of a separate one of said switching devices,
a separate output element for each switching device connected in series with said current path, each said output element requiring an operating signal of a preselected duration,
and means for applying energizing signals to all said switching devices through their respective output elements, said energizing signals being substantially coincidental with said memory energizing signals so that when a core is selected its corresponding gate is enabled and the coincidence of the signal applied to the control electrode of the corresponding switching device and the energizing signal applied to the switching device through its corresponding output element causes current to flow through said output element until said energizing signal ends.

4. In combination,
an array of memory elements for storing binary information, said array comprising $n$ columns of said elements and $x$ rows of said elements,
selecting means having output signals coupled to said elements for selecting a desired one for reading stored information,
sensing means common to all said elements,
$n$ separate logic circuits each coupled to said sensing means,
said memory selecting output signals being coupled to said $n$ logic circuits in a manner to activate the one corresponding to the column including said desired one element,
$n$ bistable devices having first and second electrodes defining a current path and a control electrode for controlling the conductivity of said path,
means coupling each different logic circuit to a different control electrode so that a trigger signal is applied to a bistable device when its corresponding logic circuit is activated,
$n$ output elements each connected in series with the current path of a different one of said $n$ bistable devices, said output elements requiring an operating signal of a preselected duration,
and means common to all said output elements for applying an energizing voltage to all said bistable devices substantially coincidentally with said trigger signal so that a desired bistable device is triggered into conduction, said energizing voltage having a duration that is sufficient to operate said output elements whereby an operating signal is applied to the corresponding output element for a time that is of sufficient duration to render said output element operative.

5. In combination, an *nx* array of memory elements for storing binary information, selecting means having output signals coupled to said elements for selecting a desired one of said elements for reading stored information, sensing means common to all said elements, *n* separate logic circuits each coupled to said sensing means, said memory selecting output signals being coupled to said *n* logic circuits in a manner to select the one corresponding to the *n* memory elements including said desired one element,

*n* bistable switching devices each having a control electrode coupled to a different one of said *n* logic circuits, said bistable devices having first and second electrodes defining a current path, with said control electrode controlling the conductivity of said path, each of said bistable devices remaining in its conduction state once triggered thereto by a trigger signal, for a time determined by the duration of an energizing voltage simultaneously applied,

*n* output elements each connected in series with said current path of a different one of said *n* bistable switching devices, said output elements requiring an operating signal of a preselected duration, and means common to all said output elements for applying an energizing voltage to all said bistable switching devices, said energizing voltage having a duration that is sufficient to operate said output elements.

6. In combination with a magnetic memory having an output terminal, means for applying memory address signals to said memory for reading information stored in said memory, a plurality of coincident signal gates each corresponding to a different memory location of said stored information, means coupling said output terminal to each one of said gates, means coupling said memory address signals to the corresponding ones of said plurality of gates so that the information signal read out from the memory and its corresponding memory address signal are applied only to one corresponding gate, a plurality of silicon controlled rectifiers having first and second electrodes defining a current path, and a control electrode controlling the conductivity of said path, each one of said rectifiers having its control electrode connected to a different one of said gates, a group of solenoids each connected in series with said current path of a different one of said rectifiers, a plurality of solenoid-activated devices, and means for applying a turn-on signal between said first and second electrodes of all said rectifiers whereby when the output signal from said one corresponding gate is applied to the control electrode of its corresponding rectifier, said rectifier is triggered into one of its conduction states and the corresponding solenoid activates its corresponding device.

7. The combination comprising, a memory for storing data, means for generating from said memory electrical signals representing said stored data, a plurality of signal controlled switching devices, one for each of said stored data, with each of said switching devices having first and second electrodes defining a current path and a control electrode for controlling the conductivity of the path, a plurality of devices, one for each of said stored data, for reproducing said stored data, a plurality of current energized elements, one for each of said data reproducing devices, for activating each associated data reproducing device, means connecting each different one of said elements in series with the current path of a different switching device so as to provide a plurality of series circuits, means coupling each different one of said electrical signals to the control electrode of its corresponding switching device, an electronic switch serially connected to all of said series circuits for applying, when turned on, an energizing signal between the first and second electrodes of each of said switching devices, and means for applying a turn-on signal to said electronic switch coincidentially with the generation of one of said electrical signals, whereby current flows through the series circuit in which the bistable device is triggered to conduction by the said one electrical signal and energizes the corresponding current energized element so as to activate its associated data reproducing device to reproduce the stored data represented by the said one electrical signal.

References Cited in the file of this patent

UNITED STATES PATENTS

| | | |
|---|---|---|
| 2,680,240 | Greenfield | June 1, 1954 |
| 2,792,525 | McArdle | May 14, 1957 |
| 2,916,727 | Jones | Dec. 8, 1959 |
| 3,042,903 | Estreems et al. | July 3, 1962 |